(12) United States Patent
Lohtia et al.

(10) Patent No.: US 7,596,115 B1
(45) Date of Patent: Sep. 29, 2009

(54) ESTABLISHING A SESSION IN A PACKET-SWITCHED WIRELESS COMMUNICATIONS NETWORK

(75) Inventors: Anit Lohtia, Plano, TX (US); Brian D. Troup, Richardson, TX (US); Yuqiang Tang, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 710 days.

(21) Appl. No.: 10/947,656

(22) Filed: Sep. 22, 2004

(51) Int. Cl.
*H04W 4/00* (2009.01)
*H04W 72/00* (2009.01)

(52) U.S. Cl. .................. 370/328; 370/310; 370/329; 455/435.1; 455/450

(58) Field of Classification Search ........ 455/43.1–444, 455/404.2, 421, 456; 370/311–334, 335, 370/310
See application file for complete search history.

(56) References Cited

U.S. PATENT DOCUMENTS

| | | | | |
|---|---|---|---|---|
| 5,182,753 A | * | 1/1993 | Dahlin et al. | 455/436 |
| 5,371,738 A | * | 12/1994 | Moelard et al. | 455/437 |
| 5,420,863 A | * | 5/1995 | Taketsugu et al. | 370/337 |
| 5,926,469 A | * | 7/1999 | Norstedt et al. | 370/329 |
| 6,192,232 B1 | * | 2/2001 | Iseyama | 455/404.1 |
| 6,373,949 B1 | * | 4/2002 | Aura | 380/247 |
| 2001/0036830 A1 | * | 11/2001 | Wu et al. | 455/436 |
| 2002/0064164 A1 | * | 5/2002 | Barany et al. | 370/401 |
| 2003/0129980 A1 | * | 7/2003 | Sayeedi | 455/435 |
| 2006/0183483 A1 | * | 8/2006 | Hidaka | 455/450 |
| 2006/0274692 A1 | * | 12/2006 | Ryu | 370/331 |

OTHER PUBLICATIONS

J. Postel, Request for Comments 791, "Internet Protocol," Sep. 1981, pp. 1-45.
W. Simpson, Request for Comments 1661, "The Point-to-Point Protocol (PPP)," Jul. 1994, pp. 1-52.
W. Simpson, Request for Comments 1994, "PPP Challenge Handshake Authentication Protocol (CHAP)," Aug. 1996, pp. 1-12.
C. Perkins, Request for Comments 2002, "IP Mobility Support," Oct. 1996, pp. 1-79.
S. Deering and R. Hinden, Request for Comments 2460, "Internet Protocol, Version 6 (IPv6)," Dec. 1998, pp. 1-39.
B. Aboba and M. Beadles, Request for Comments 2486, "The Network Access Identifier", Jan. 1999, pp. 1-8.
"Inter-Operability Specification (IOS) for High Rate Packet Data (HRPD) Access Network Interfaces," $3^{rd}$ Generation Partnership Project 2 "3GPP2", A.S0007-0 Version 2.0, Nov. 2001, pp. i-vi, 1-1 to 5-10, Annexes A-E.

(Continued)

*Primary Examiner*—Lester Kincaid
*Assistant Examiner*—Daniel Lai
(74) *Attorney, Agent, or Firm*—Trop, Pruner & Hu., P.C.

(57) ABSTRACT

A packet-switched wireless communications network includes a mobile station and a radio network controller that are able to establish a radio connection therebetween. Messages are exchanges over one or more traffic channels to establish a packet-switched services session between the mobile station and the radio network controller. The radio connection is not closed until all messages for establishing the packet-switched services session have been exchanged between the mobile station and the radio network controller.

12 Claims, 2 Drawing Sheets

OTHER PUBLICATIONS

"cdma2000 High Rate Packet Data Air Interface Specification," 3rd Generation Partnership Project 2 "3GPP2", C.S0024 Version 2.0, Oct. 27, 2000, pp. i-xli, 1-1 to 5-39.

U.S. Appl. No. 09/960,008, filed Sep. 21, 2001, Morales, et al.
U.S. Appl. No. 10/913,664, filed Aug. 6, 2004, Lohtia, et al.

* cited by examiner

ESTABLISHING A SESSION IN A PACKET-SWITCHED WIRELESS COMMUNICATIONS NETWORK

TECHNICAL FIELD

The invention relates generally to establishing a session in a packet-switched wireless communications network.

BACKGROUND

Mobile communications systems are made up of a plurality of cells. Each cell provides a radio communications center through which a mobile station establishes a call or other communications session with another mobile station or a terminal connected to either a circuit-switched network (e.g., public-switched telephone network or PSTN) or a packet-switched data network. Each cell includes a radio base station, with each base station coupled to a switching center that controls processing of calls or other communications sessions between or among mobile stations or between mobile stations and terminals connected to a circuit-switched or a packet-switched network.

Various wireless protocols exist for defining communications in a wireless network. One type of protocol is based on the time-division multiple access (TDMA) technology, such as the TIA/EIA-136 standard provided by the Telecommunications Industry Association (TIA) or the Global System for Mobile (GSM) standard. Another type of protocol for wireless communications is based on the code-division multiple access (CDMA) technology. CDMA is a spread spectrum wireless communications protocol in which transmission is based on the spread spectrum modulation technique to allow many users to have access to the same band of carriers.

Traditionally, wireless networks have been designed for carrying circuit-switched voice traffic. However, with the wide availability of the Internet and intranets, packet-switched communications (e.g., web browsing, electronic mail, instant messaging, electronic gaming, and so forth) have become common. As a result, third generation (3G) and beyond wireless technologies are being developed and implemented to provide higher bandwidth and more efficient packet-switched communications (of data as well as voice and other forms of real-time data) over wireless networks.

In the CDMA context, a CDMA 2000 family of standards has been developed that is capable of supporting both traditional circuit-switched wireless communications protocols have also been developed. On the TDMA side, packet-switched wireless communications protocols have also been developed.

The first phase of CDMA 2000 is referred to as 1xRTT (also referred to as 3G1X or 1X), which is designed to increase voice capacity as well as to support data transmission speeds that are faster than typically available. In addition, for even higher data rates, a High Rate Packet Data (HRPD) wireless technology has been developed. HRPD is defined as TIA/EIA/IS-856, "CDMA 2000, High Rate Packet Data Air Interface Specification," which is adopted by the TIA. The HRPD technology is also referred to as the 1xEV-DO or 1xEV technology. 1xEV-DO provides relatively high data transfer rates over the air interface between mobile stations and base stations.

To establish 1xEV-DO session over a wireless link, various session configuration messages are exchanged over a radio connection between the mobile station and the radio network controller over traffic channels. However, other types of messages for establishing the 1xEV-DO session are exchanged on control channels, such as location update messages and hardware identifier messages. Typically, exchanging messages over a control channel usually takes longer than exchanging messages over traffic channels when establishing a 1xEV-DO session.

The 1xEV-DO session establishment is not complete until the location update messages and hardware identifier messages have been exchanged. However, if the mobile station is located near a boundary between two radio network controllers, handoff may occur from one radio network controller to another radio network controller. As a result of a handoff procedure, the radio connection may be closed prior to all messages needed for 1xEV-DO session establishment being exchanged. Closing the radio connection prior to complete session establishment results in 1xEV-DO session establishment failure, since all messages needed for session establishment has not yet been exchanged. After handoff, the mobile station will have to repeat the procedures for establishing the 1xEV-DO session with the new radio network controller. Having to repeat such procedures is time-consuming and wastes radio resources of the wireless communications network.

SUMMARY

In general, methods and apparatus are provided to efficiently establish a session in a packet-switched wireless communications network. For example, a packet-switched wireless communications network includes a mobile station and a radio network controller that are able to establish a radio connection therebetween. Messages are exchanged over one or more traffic channels to establish a packet-switched services session between the mobile station and the radio network controller. The radio connection is not closed until all messages for establishing the packet-switched services session have been exchanged between the mobile station and the radio network controller.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
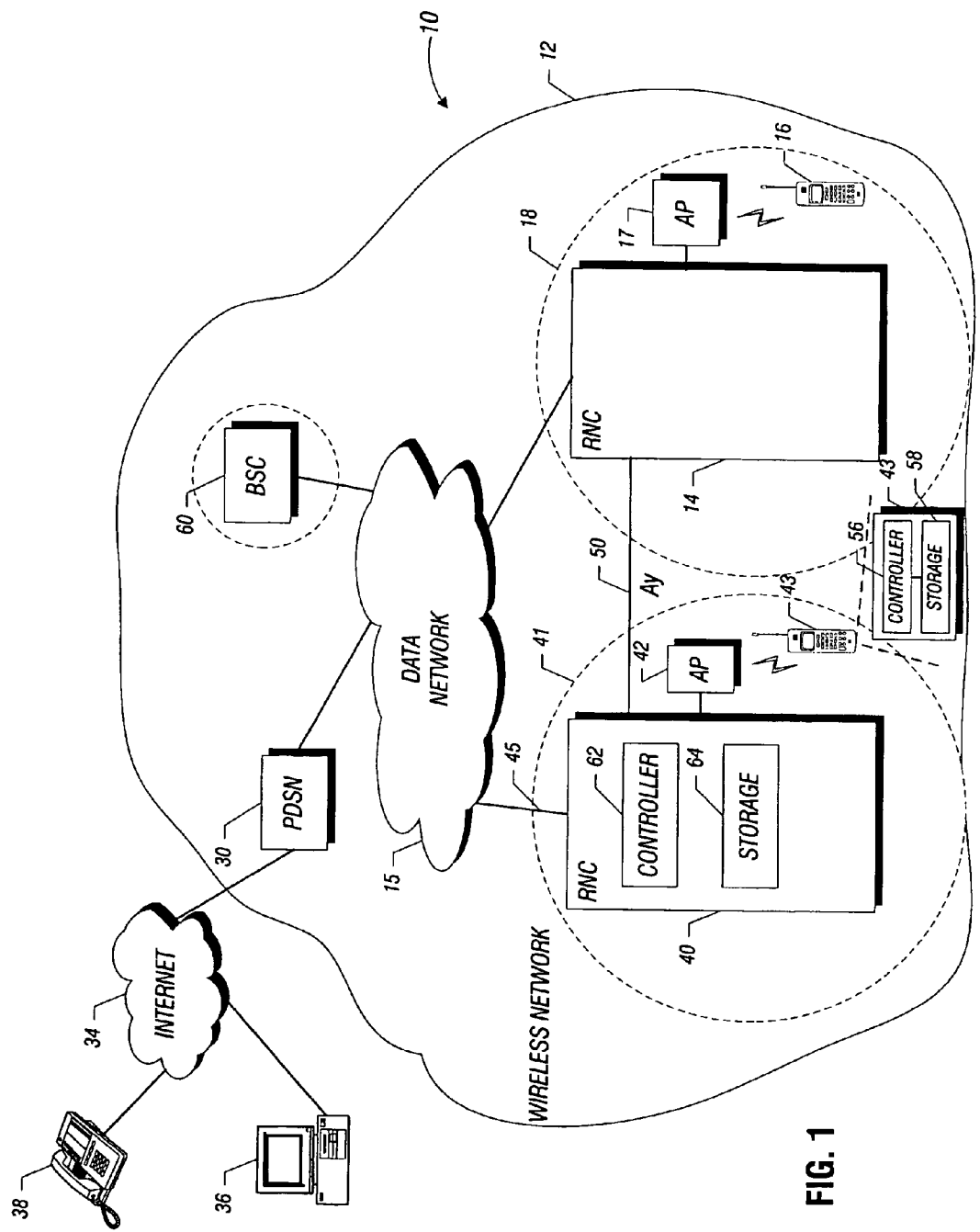
FIG. 1 is a block diagram of an example packet-switched wireless or mobile communications network that incorporates an embodiment.

Referring to FIG. 1, a wireless communications network 10 has a coverage area designated generally as 12. In one embodiment, the wireless communications network 10 includes components that operate according to the CDMA (code-division multiple access) 2000 protocol. CDMA 2000 is defined by the CDMA 2000 family of standards (collectively referred to as the IS-2000 Standard, which is developed by the Third Generation Partnership Project 2 (3GPP2)). In other embodiments, other types of wireless protocols, such as TDMA (time-division multiple access) protocols, can be used for communications in the wireless communications network 10.

Optionally, for circuit-switched communications, the wireless communications network 10 includes a base station controller (BSC) 60. For communicating circuit-switched voice traffic, the BSC 60 is coupled to a mobile switching center (MSC) (not shown), which is responsible for switching mobile station-originated or mobile station-terminated traffic. Effectively, the MSC is the interface for signaling and user traffic between the wireless network 10 and other public-switched networks (such as a public-switched telephone network (PSTN) or other MSCs).

The BSC 60 can also support packet-switched communications, in which packet data is communicated between a mobile station and another endpoint, which can be a terminal coupled to a data network 34 or another mobile station that is capable of communicating packet data. Examples of the data network 34 include private networks (such as local area networks or wide area networks) and public networks (such as the Internet). In one example, the BSC 60 is part of a 1xRTT wireless network, which supports packet data services through a packet data serving node (PDSN) 30. The BSC 60 is coupled to the PDSN 30 through a data network 15.

Packet data services involve packet-switched communications. In some embodiments, packet-switched communications are defined by the Internet Protocol (IP). In packet-switched communications, packets or other units of data carry payload (including user data) as well as header information including routing information (in the form of addresses) used for routing the packets or data units over one or more paths of the network to a destination endpoint. One version of IP, referred to as IPv4, is described in Request for Comments (RFC) 791, entitled "Internet Protocol", dated September 1981; and another version of IP, referred to as IPv6, is described in RFC 2460, entitled "Internet Protocol, Version 6 (IPv6) Specification", dated December 1998. The data network 15 can be an IP network.

In addition to, or in place of, nodes that are part of a 1xRTT wireless system, the wireless communications network 10 also includes a 1xEV-DO or 1xEV wireless system that supports packet data services. One version of 1xEV-DO is defined in the TIA/EIA/IS-856 standard, entitled "CDMA 2000 High Rate Packet Data Air Interface Specification". The 1xEV-DO wireless communications system includes access networks (AN) (also referred to as "radio network controllers" or "RNCs") 14 and 40, that provide data connectivity between a packet-switched data network (such as the data network 34) and a mobile station 16 or 43 (also referred to as an "access terminal").

The radio network controllers 14 or 40 are connected to access points 17 and 42, respectively. The access point 17 or 42 is an entity used for radio frequency (RF) communications with mobile stations within a cell or cell sector 18 or 41, respectively. The access network 14 or 40 and access point 17 or 42 provide coverage in a cell or cell sector 18 or 41, respectively. More generally, reference is made to a "cell segment", which refers to either a cell or cell sector. Also, "mobile station" generally refers to either a mobile station or an access terminal. Also, the term "radio network controller" or "RNC" refers to a 1xEV-DO RNC, a 1xRTT BSC, or any other type of radio network controller or base station controller.

Although one implementation is described in the context of a 1xEV-DO system, other types of packet-switched wireless systems can be used in other implementations, such as 1xEV-DV (also referred to as 1xEV-DO Rev. D). More generally, a "1xEV" network or system refers to any of the various versions of the protocols associated with CDMA 2000 that have been evolved to support higher rate packet data transfer. Embodiments can also be used in other types of packet-switched wireless networks. A "packet-switched wireless network" or "packet-switched wireless communications network" refers to a wireless or mobile communications network that is able to provide packet-switched services (e.g., electronic mail, web browsing, electronic gaming, voice-over-IP, etc.). A 1xEV-DO wireless network is an example of a packet-switched wireless network that supports packet-switched services without supporting circuit-switched services. Such a packet-switched wireless network is also referred to as a "packet-switched services only wireless network." An RNC in a packet-switched services only wireless network is referred to as a "packet-switched services only RNC." On the other hand, a 1xRTT wireless network is an example of a packet-switched wireless network that supports both packet-switched and circuit-switched services.

The radio network controller 40 includes a controller 62 (to perform various tasks) and storage 64 (to store data). The mobile station 43 also includes a controller 56 (to perform various tasks) and a storage 58 (to store data). The radio network controller 14 and mobile station 16 are similarly configured.

The radio network controller 14 or 40 is coupled to the PDSN 30 through the data network 15, such as an R-P (Radio Packet) transport network, to enable packet-switched communications with the packet-switched data network 34. An R-P transport network (or interface) supports establishment of an R-P session, which is a logical connection between the RNC and the PDSN for a particular PPP (Point-to-Point Protocol) session. PPP is described in RFC 1661, entitled "The Point-to-Point Protocol (PPP)," dated July 1994.

During a communications session, packet data is routed between the mobile station 16 or 43 and another endpoint through the radio network controller 14 or 40, R-P transport network 15, and PDSN 30. In addition to the R-P transport network 15 being a packet-switched network (e.g., an IP network), the link between the AP 17 or 42 and the RNC 14 or 40, respectively, can also be a packet-switched network (e.g., an IP network).

Although only two RNCs and APs and one BSC are depicted in FIG. 1, it is noted that the wireless communications network 10 includes multiple RNCs, APs, and BSCs.

In accordance with some embodiments, a more efficient mechanism is provided for establishing a 1xEV-DO session between a mobile station 16 or 43 and a respective radio network controller 14 or 40. Establishing a 1xEV-DO session refers to exchanging predetermined parameters and settings between the mobile station and the radio network controller such that packet-switched communications can be performed.

To establish a 1xEV-DO session, a radio connection is first established between the mobile station and radio network controller. The radio connection is established between a connection layer in the mobile station and a connection layer in the radio network controller. The connection layer for 1xEV-DO is described in greater detail in TIA/EIA/IS-856. A "radio connection" refers to a connection established between the mobile station and radio network controller over the wireless link in which control and traffic channels are defined to carry messages and information between the mobile station and radio network controller.

In one embodiment, once a radio connection has been established, the mobile station is assigned a forward traffic channel, a reverse traffic channel, and a reverse power control channel. The reverse traffic channel is used by the mobile station to communicate messages to the radio network controller, and the forward traffic channel is used by the radio network controller to communicate messages back to the mobile station. The reverse power control channel is used for controlling the power of the mobile station. In addition to these channels, a control channel is also available for communicating other control messaging between the mobile station and the radio network controller.

Among the messages that are exchanged over traffic channels of a radio connection between the mobile station and radio network controller are configuration messages, including a ConfigurationRequest message to request configuration of one or more parameters, and a ConfigurationResponse message to select parameter settings. The ConfigurationRequest and ConfigurationResponse messages are exchanged for establishing a 1xEV-DO session between the mobile station and the radio network controller.

In accordance with some embodiments, in addition to exchanging the configuration messages over the traffic channels between the mobile station and radio network controller, other messages, such as hardware identifier messages and location update messages are also exchanged over the traffic channels, rather than over control channels as conventionally performed in a 1xEV-DO wireless communications network. The hardware identifier messages contain a HardwareIDRequest message (sent by the radio network controller to query the mobile station for its hardware identifier information) and a HardwareIDResponse message (sent by the mobile station in response to the HardwareIDRequest message). The hardware identifier of the mobile station includes the equipment serial number (ESN) of the mobile station, or some other hardware identifier of the mobile station.

The location update messages include a LocationRequest message (which is sent by the radio network controller to the mobile station) to determine the location of the mobile station, and a LocationResponse message (sent by the mobile station to the radio network controller) to indicate the current location of the mobile station. Note that the location information stored in the mobile station is typically assigned by a radio network controller.

Normally, the configuration messages, hardware identifier messages, location update messages, and other messages, must all be exchanged before 1xEV-DO session establishment is successful.

To increase the likelihood of success of 1xEV-DO session establishment in accordance with some embodiments, the radio connection between the mobile station and the radio network controller is not terminated until all messages needed for the establishment of the 1xEV-DO session have been exchanged between the mobile station and the radio network controller. Additionally, instead of exchanging messages such as the hardware identifier messages and location update messages over a control channel (as conventionally done), some embodiments exchange the messages over traffic channels.

The benefit of exchanging, for example, the hardware identifier messages and the location update messages across traffic channels between the mobile station and radio network controller, rather than control channel(s) between the mobile station and a radio network controller, is that faster communication of such messages is possible. Typically, it takes a longer period of time to exchange messages over a control channel for establishing a 1xEV-DO session. For example, in some conventional 1xEV-DO systems, the location update procedure on a control channel can take up to 15 seconds to complete. By exchanging messages for the location update procedure on a traffic channel instead of the control channel, the location update procedure can be performed in under one second, according to some implementations.

The radio network controller and mobile station each includes logic to prevent termination of a radio connection until all messaging for establishing the 1xEV-DO session have been exchanged. Thus, even if a mobile station is at a boundary between two radio network controllers, the handoff from a source radio network controller to a target radio network controller is prevented until the 1xEV-DO session has been established. This reduces the likelihood of 1xEV-DO session establishment failure, and thus reduces the likelihood that messages for establishing a 1xEV-DO session would have to be repeated due to a prior session establishment failure.

Figure 2:
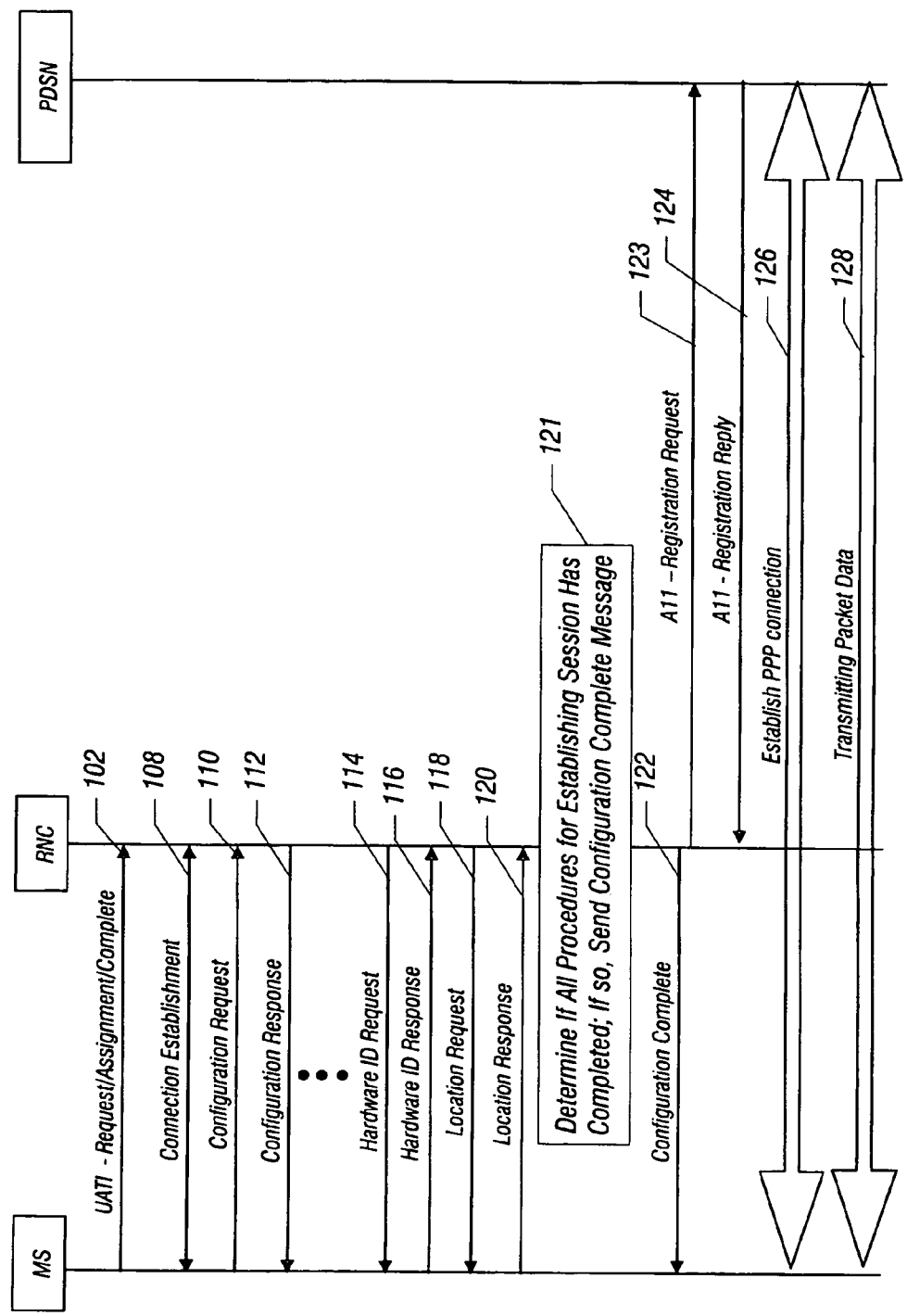
FIG. 2 is a message flow diagram that depicts procedures according to some embodiments for establishing a session between a mobile station and a radio network controller in the packet-switched wireless communications network of FIG. 1.

FIG. 2 shows a call flow that illustrates the procedure in response to a mobile station being initialized (e.g., being turned on for the first time) in a 1xEV-DO wireless network. The mobile station and RNC perform (at 102) an exchange of UATI (Unicast Access Terminal Identifier) messages, including a UATI-Request message, a UATI-Assignment message, and a UATI-Complete message. In this procedure, the RNC assigns a unique UATI to the mobile station. After UATI assignment, a 1xEV-DO session establishment procedure between the mobile station and the RNC is started.

To enable such an establishment, a radio connection is first established (at 108) between the mobile station and the radio network controller. When the radio connection is open, traffic channels (forward traffic channel and reverse traffic channel) and a reverse power control channel are assigned to the mobile station. Communications between the mobile station and the radio network controller are conducted over the assigned channels, as well as over a control channel.

Messages that can be exchanged over the traffic channels include a ConfigurationRequest message (note that a ConfigurationRequest can be initiated by either the mobile station or the radio network controller). In FIG. 2, the mobile station first sends a ConfigurationRequest message (at 110) to the radio network controller. In response, the radio network controller sends (at 112) a ConfigurationResponse message to the mobile station. Additional ConfigurationRequest and ConfigurationResponse messages can be exchanged between the mobile station and radio network controller. In some cases, the radio network controller is the one that sends a ConfigurationRequest message to the mobile station, with the mobile station responding with a ConfigurationResponse message.

In accordance with some embodiments, the hardware identifier request message (HardwareIDRequest) is sent (at 114) over a traffic channel from the radio network controller to the mobile station to request the hardware identifier of the mobile station. In response, the mobile station sends (at 116) the hardware identifier in a hardware identifier response message (HardwareIDResponse), also over a traffic channel, to the radio network controller.

Another message that can be exchanged over a traffic channel is a location request message (LocationRequest) sent (at 118) from the radio network controller to the mobile station. The mobile station then sends (at 120) a location response message (LocationResponse) to the radio network controller, also over the traffic channel.

Note that the messages depicted in FIG. 2 are examples of some of the messages exchanged between the mobile station and the radio network controller to establish a 1xEV-DO session. Other messages can also be exchanged between the mobile station and the radio network controller over the traffic channels.

At this point, the radio network controller determines (at 121) if all procedures for establishing a 1xEV-DO session has been completed. If not, the radio network controller does not send a configuration complete message (ConfigurationComplete) message to the mobile station. Not sending the configuration complete message effectively prevents the mobile station from terminating the radio connection between the mobile station and radio network controller. However, if all procedures have been performed to successfully complete establishment of the 1xEV-DO session, then the radio network controller sends (at 122) a configuration complete message (ConfigurationComplete) to the mobile station.

Once the ConfigurationComplete message is sent by the radio network controller, the radio connection between the radio network controller and a mobile station can be closed, if desired. Note that in a conventional 1xEV-DO wireless communications network, the ConfigurationComplete message is usually sent after the configuration messages have been exchanged.

Next, the RNC sends (at 123) an A11 Registration Request message containing a MSID (mobile station identifier), such as an IMSI (International Mobile Subscriber Identity), to the PDSN. The A11 Registration Request message is sent to establish an R-P session (also referred to as an A10 connection) between the RNC and PDSN. The A11 Registration Request message is described in RFC 2002, entitled "IP Mobility Support" dated October 1996.

The PDSN validates the A11 Registration Request message and accepts the connection by returning (at 124) an A11 Registration Reply message with an accept indication to the RNC. Next, a PPP establishment procedure is initiated (at 126) between the mobile station and the PDSN. PPP provides a standard method for transporting multi-protocol packets over point-to-point links. Here, the PPP session is to be established between the mobile stations and a PDSN. Once the PPP session has been established, packet data can be communicated (at 128) between the mobile station and the PDSN.

The tasks performed by the RNC and mobile stations are provided by software routines or modules in the RNC and mobile stations. Instructions of such software routines or modules are stored on one or more storage devices in the corresponding systems and loaded for execution on corresponding processors. The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. An article comprising at least one processor-readable storage medium containing instructions that when executed cause a radio network controller in a packet-switched wireless communications network to:
   establish a radio connection over a wireless link with a mobile station, wherein one or more traffic channels are assigned to the mobile station in the radio connection;
   exchange messages over the one or more traffic channels in the radio connection to establish a packet-switched services session with the mobile station;
   prevent the radio connection from being closed by preventing sending of a configuration complete message from the radio network controller to the mobile station until messages for establishing the packet-switched services session have been exchanged between the radio network controller and the mobile station, wherein the messages for establishing the packet-switched services session include at least one hardware identifier message containing a hardware identifier of the mobile station, and at least one location update message to obtain a location update of the mobile station; and
   prevent a handoff from being performed until the messages including the at least one hardware identifier message and the at least one location update message for establishing the packet-switched services session have been exchanged between the radio network controller and the mobile station.

2. The article of claim 1, wherein exchanging the messages over the one or more traffic channels to establish the packet-switched services session comprises exchanging messages over the one or more traffic channels to establish a 1xEV-DO session.

3. The article of claim 1, wherein exchanging the messages over the one or more traffic channels to establish the packet-switched services session comprises exchanging messages over the one or more traffic channels to establish a 1xEV session.

4. The article of claim 3, wherein the at least one hardware identifier message comprises a HardwareIDRequest message and a HardwareIDResponse message communicated over the one or more traffic channels.

5. The article of claim 4, wherein exchanging the messages over the one or more traffic channels further comprises communicating a ConfigurationRequest message and a ConfigurationResponse message over the one or more traffic channels.

6. The article of claim 5, wherein the at least one location update message comprises a LocationRequest and a LocationResponse message communicated over the one or more traffic channels.

7. A system for use in a packet-switched wireless communications network, comprising:

an interface to establish a radio connection over a wireless link with a mobile station, wherein one or more traffic channels are assigned to the mobile station in the radio connection; and a controller to:

exchange messages over the one or more traffic channels in the radio connection to establish a packet-switched services session with the mobile station;

prevent the radio connection from being closed by preventing sending of a configuration complete message from the radio network controller to the mobile station until all messages for establishing the packet-switched services session have been exchanged between the radio network controller and the mobile station; and prevent a handoff from being performed until all messages for establishing the packet-switched services session have been exchanged between the radio network controller and the mobile station.

8. The system of claim 7, wherein the packet-switched services session comprises a 1xEV session.

9. The system of claim 8, wherein the messages exchanged over the one or more traffic channels comprise a message containing a hardware identifier of the mobile station, and wherein the sending of the configuration complete message from the radio network controller to the mobile station is prevented until all messages including the message containing the hardware identifier for establishing the packet-switched services session have been exchanged between the mobile station and the radio network controller.

10. The system of claim 9, wherein the hardware identifier comprises a message containing an equipment serial number of the mobile station.

11. The system of claim 7, wherein the messages exchanged over the one or more traffic channels comprise one or more messages to obtain a location update of the mobile station, and wherein the sending of the configuration complete message from the radio network controller to the mobile station is prevented until all messages including the one or more messages to obtain the location update of the mobile station for establishing the packet-switched services session have been exchanged between the mobile station and the radio network controller.

12. The system of claim 11, wherein the messages exchanged over the one or more traffic channels comprise one or more configuration messages relating to the mobile station.

* * * * *

UNITED STATES PATENT AND TRADEMARK OFFICE
CERTIFICATE OF CORRECTION

PATENT NO.        : 7,596,115 B1                                  Page 1 of 1
APPLICATION NO.   : 10/947656
DATED             : September 29, 2009
INVENTOR(S)       : Lohtia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1248 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,596,115 B1 | Page 1 of 1 |
| APPLICATION NO. | : 10/947656 | |
| DATED | : September 29, 2009 | |
| INVENTOR(S) | : Lohtia et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1248 days.

On the Title Page, Item (56), under "OTHER PUBLICATIONS", Line 13, delete "(I0S)" and insert -- (IOS) --, therefor.

Signed and Sealed this

Second Day of November, 2010

David J. Kappos
*Director of the United States Patent and Trademark Office*